United States Patent [19]

Fries et al.

[11] Patent Number: 5,138,127

[45] Date of Patent: Aug. 11, 1992

[54] PRESSURE WELDING WITH CLOSED LOOP FORCE CONTROL

[75] Inventors: William M. Fries, San Diego; Thomas L. Ratledge, Carlsbad; William H. Hill, Pala; Joseph E. Donner, Vista, all of Calif.

[73] Assignee: Hughes Aircraft Company, Los Angeles, Calif.

[21] Appl. No.: 738,390

[22] Filed: Jul. 31, 1991

[51] Int. Cl.⁵ ............................................. B23K 11/24
[52] U.S. Cl. ........................... 219/86.51; 219/56.21; 219/86.32; 219/109; 228/8
[58] Field of Search ............... 219/110, 56.21, 109, 219/86.51, 86.32; 228/8

[56] References Cited

U.S. PATENT DOCUMENTS

| 3,727,822 | 4/1973 | Umbaugh | 219/110 |
| 4,697,058 | 9/1987 | Mueller | 219/56.21 |
| 4,817,848 | 4/1989 | Gabaldon | 219/56.21 |

Primary Examiner—Clifford C. Shaw
Attorney, Agent, or Firm—Terje Gudmestad; Jeannette M. Walder; Wanda K. Denson-Low

[57] ABSTRACT

A parallel-gap welder applies a precisely controlled force to the weld head (40) by means of a solenoid (60) having a plunger (72) aligned with the axis of the welding electrodes (50,52). To precisely control the amount of force applied by the solenoid a load cell (80) is interposed between the weld head (40) and the solenoid plunger (72) to provide a feedback force signal (158) indicative of the force applied by the solenoid. The feedback force signal is used to control current through the solenoid coil (68) and thereby servo the applied force to a force command input. The solenoid plunger (72) and load cell (80) are axially aligned with the axis of the electrodes (50,52) and solenoid force is applied through a universal joint (76,78) connection to assure an in-line driving force on the electrodes.

3 Claims, 4 Drawing Sheets

PRESSURE WELDING WITH CLOSED LOOP FORCE CONTROL

BACKGROUND OF THE INVENTION

1. Field of the Invention

The present invention relates to methods and apparatus for welding, and more particularly concerns welding in which a controlled force is applied to press electrodes against a work piece.

2. Description of Related Art

In many types of welding it is necessary to press welding electrodes against a work piece while the welding operation takes place. Pressure welding of this type, in general, includes various types of resistance welding, thermo-compression welding, ultrasonic bonding and similar methods for joining materials. Materials to be joined include integrated circuit electrical connectors, IC chip leads and wire mesh connectors employed for electrically joining solar cells, among others.

Accordingly, the term "welding" as employed herein also includes various types of bonding which require application of controlled amounts of pressure during the bonding or joining operation.

Parallel-gap welding refers to a resistance welding operation employing a pair of mutually spaced electrodes which contact the work piece to provide flow of current from one electrode to the other through the work piece or work pieces against which the electrodes are pressed. The flow of electrical current through the work heats the work to a softened condition, and the simultaneous application of pressure provides strong mechanical bonding between elements of the work. Parallel-gap welding apparatus of the prior art include dead-weight weld heads wherein a weight applies the desired force. Open-loop weld heads may employ a solenoid to drive the weld head against the work, but the amount of current to drive the solenoid must be predetermined. Such devices provide no means for monitoring or otherwise precisely controlling the amount of force applied by the solenoid. Pneumatic and cable operation devices also fail to provide precise control of forces and add greater complexity to the apparatus.

In such prior devices the amount of force that is actually applied is not known, and therefore no history of force applied in a number of welds can be obtained to enable analysis and evaluation of reliability and consistency of the welds. Dead-weight weld heads are limited to vertical operation and, moreover, exhibit high inertia and impact forces which are undesirable.

Precise control of the amount of welding force and control of the profile of applied force are highly desirable, particularly in automatic welding equipment to improve repeatability, reliability, analysis and quality, but have not been available heretofore. Accordingly, it is an object of the present invention to provide for welding operations that avoid or eliminate above-mentioned problems.

SUMMARY OF THE INVENTION

In carrying out principles of the present invention in accordance with a preferred embodiment thereof, a weld head is movably mounted to the support for motion toward and away from a work piece to be welded and carries electrodes that are adapted to press against the work piece. Drive means are provided for applying force to the weld head, to thereby cause the electrodes to press against the work piece, and pressure sensing means are interposed between the drive means and the weld head for generating a force signal representative of force applied by the drive means. Feedback means responsive to the force signal are employed to control the drive means and thereby precisely control force applied to the work piece.

DESCRIPTION OF THE PREFERRED EMBODIMENT

Figure 1:
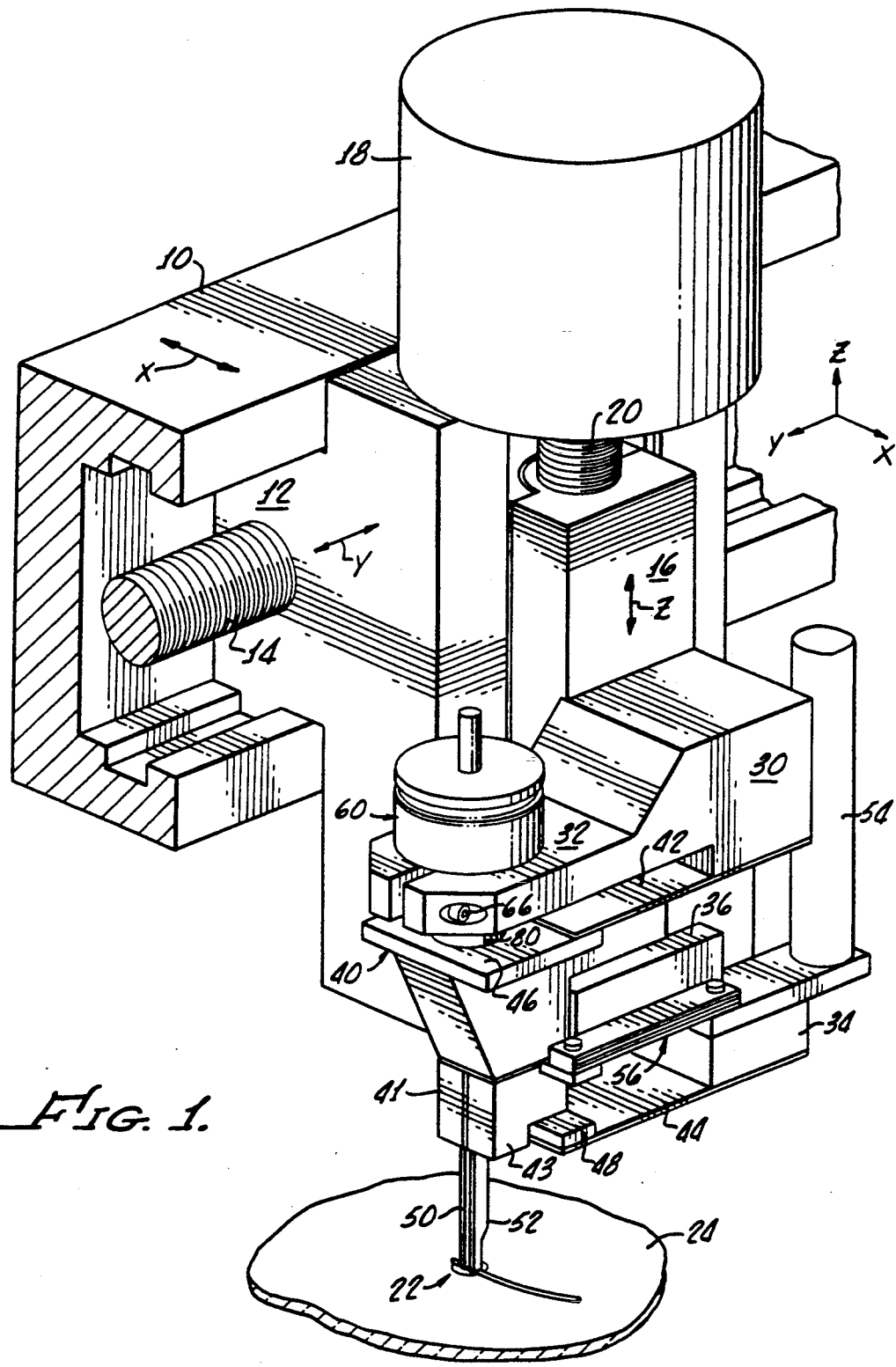
FIG. 1 is a pictorial illustration of parts of a parallel-gap welding apparatus embodying principles of the present invention.

Illustrated in FIGS. 1 through 4 are portions of a parallel-gap welding apparatus that has been arranged, in this particular embodiment, for the welding of interconnecting mesh that electrically connects solar cells, where the cells are interconnected by a sixty percent open electrically conductive mesh. In an automatic welding machine, the weld head is mounted for X,Y and Z motion. FIG. 1 illustrates two of these motions, namely the Y axis and Z axis motion. Thus, a Y axis gantry 10, which itself may be mounted for horizontal X axis motion by apparatus not shown, slidably carries a Y axis slide block 12 that is driven along the horizontal Y axis by a lead screw 14. The Y axis slide 12 itself carries a Z axis slide or carriage 16, slidably mounted for vertical motion in the horizontally movable slide block 12, and driven via a motor 18 and a lead screw 20 toward and away from a work piece 22 carried by a fixed work support table 24.

Z axis carriage slide 16 includes an enlarged body portion 30 from which projects a forwardly extending upper support arm 32 and a laterally projecting lower support arm 34 at a lower end thereof. The upper and lower arms 32,34 are fixedly connected with the carriage slide body, which also fixedly carries a contact support block 36 extending forwardly but spaced below the upper arm 32.

A weld head, generally indicated at 40, is movably carried by the Z axis carriage 30 by means of a pair of horizontally disposed, mutually parallel and spaced thin resilient flexure plates 42,44. Preferably each plate is made of a thin, resilient, stainless steel, about one inch wide, and the plates are fixed at inner ends thereof respectively to Z axis carriage slide 30 and to lower arm 34 of the Z axis slide. The plates project forwardly from the Z axis slide and have outer ends thereof fixedly connected respectively to an upper plate 46 and to a lower plate 48 which are fixed parts of the weld head. Thus the weld head is mounted for vertical flexural motion relative to the carriage 16, in the direction of the Z axis, for a limited amount of motion.

The terms "horizontal" and "vertical" are employed for convenience of description, whereas other orientations of the machine parts can be used. Thus, the terms such as "vertical" used herein are not to be construed as limited to any particular direction. For example, the carriage slide could be mounted for horizontal motion toward and away from a work piece (with welding pressure applied horizontally) without adversely affecting operation.

The lower end of the head 40 is divided into two mutually insulated sections 41,43 which carry a welding tool in the form of a pair of elongated parallel, closely spaced electrodes 50,52. The electrodes are electrically connected to a source of welding current via a cable 54 carried by the Z axis carriage 16. Cable 54 is electrically connected to a flexible electrical conductor 56 formed of a stack of mutually insulated thin copper plates, each having a typical cross section of about 0.5 inches by 0.002 inches. The copper shunt plates 56 are electrically connected at one end to the current carrying cable 54 and bridge the space between the Z axis slide and the weld head, are fixedly connected at their respective ends to the slide and weld head, and are electrically connected by suitable means (not shown) to the electrodes 50 and 52. The several copper shunt plates are divided into two mutually insulated groups. One group of shunt plates is connected to one of the electrodes, and the other group of shunt plates is connected to the other of the electrodes.

A solenoid 60 is fixedly mounted to the upper side of Z axis slide arm 32. The slide arm is split at its forward end and provided with an internally threaded aperture to receive a threaded connecting fitting 62 (FIG. 4) that is fixed to a lower side of and depends from a housing 64 of the solenoid. A clamping screw 66 (FIG. 1) interconnects the two sections of the split forward portion of arm 32 to lock the fitting 62 and thereby lock the solenoid to the Z axis slide arm 32. The solenoid includes a coil 68, which surrounds a plunger 70, having a driven shaft 72 of which the lower end is indented, as at 74, to receive a steel ball 76. The steel ball 76 is received in the indented portion 74 of plunger shaft 72 and welded thereto.

Ball 76 is mounted for a small amount of universal angular adjustment in a ball socket or nest 78 that rests upon the upper side of a load cell 80. The ball rests freely in the socket 78, which has the same spherical diameter as the ball, upon a jewel 79 within the socket 78.

Figure 4:
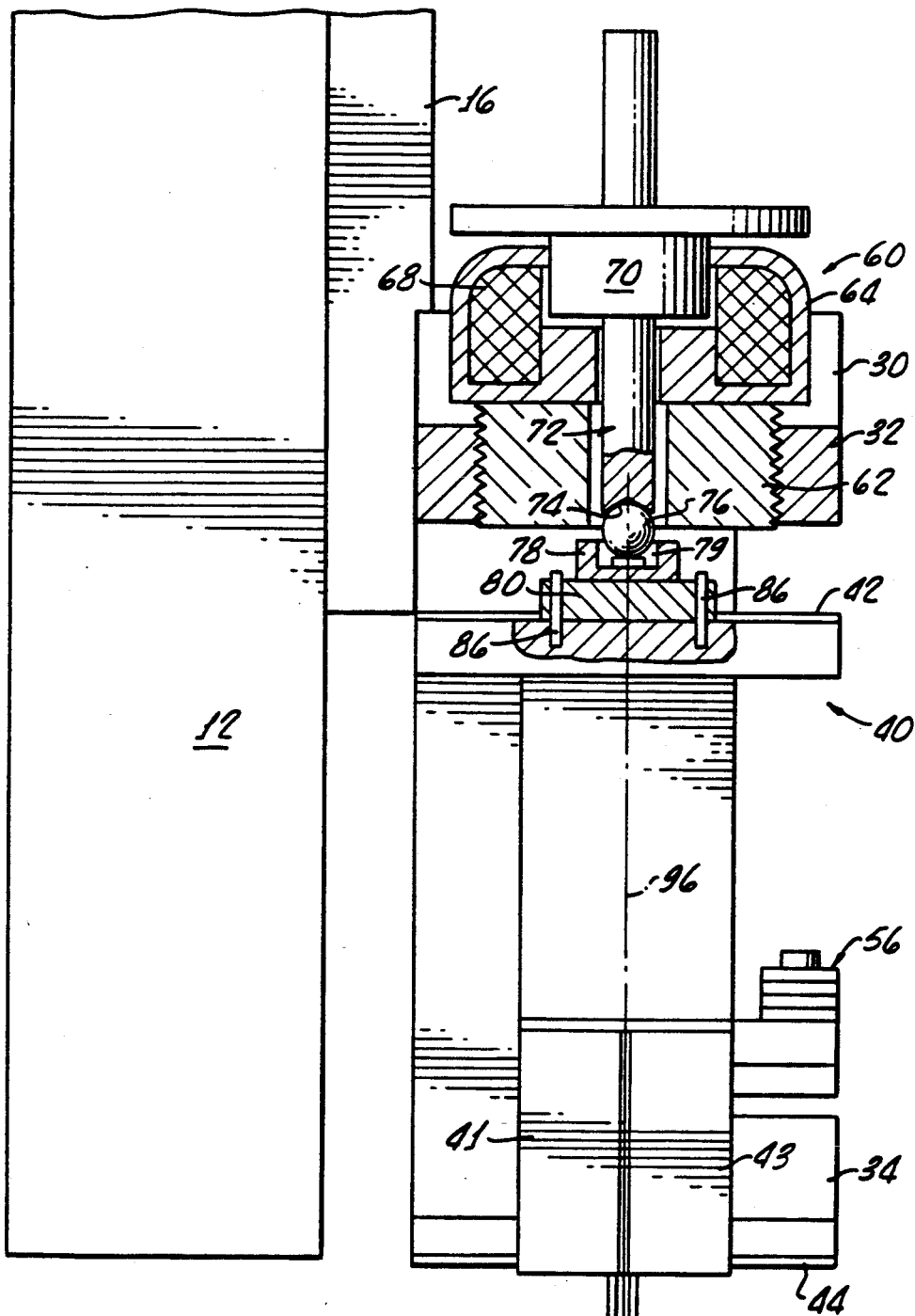
FIG. 4 is a side view, with parts broken away, showing the relation among various driving elements of the weld head.

Load cell 80 may have a force application button (not shown) on the top thereof which is of the same diameter as the bottom face of socket 78. The load cell rests upon the upper surface of weld head 40 and is retained in position by three pins 86, of which only two are shown in FIG. 4.

Figure 2:
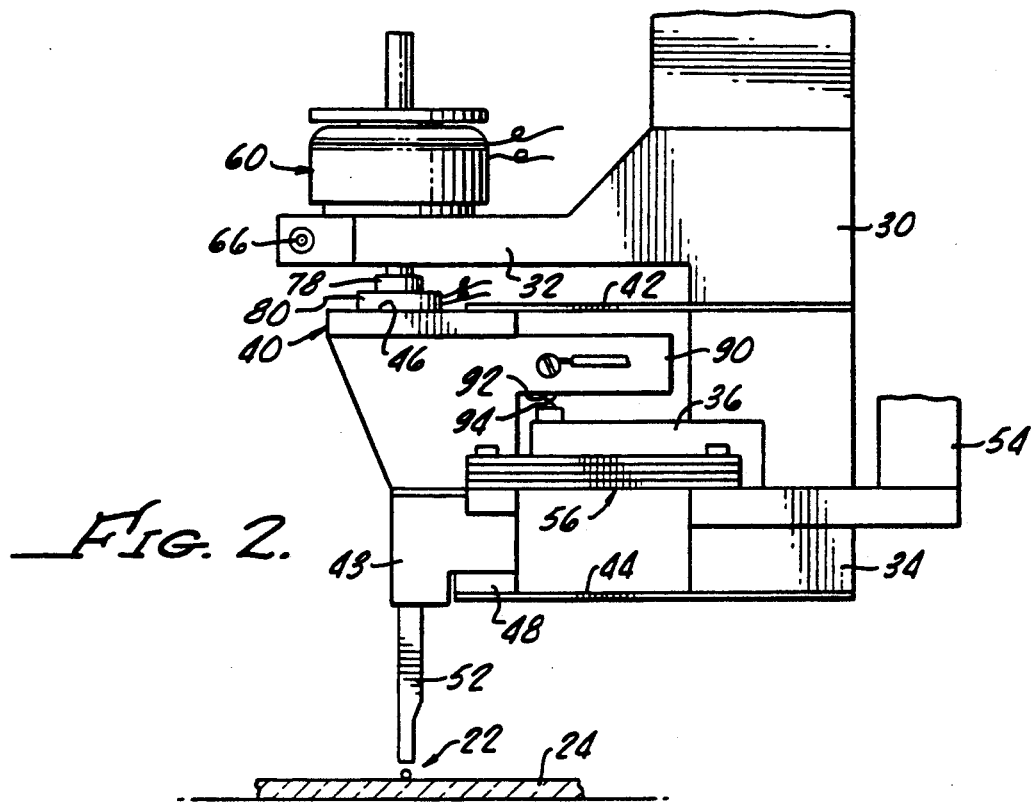
FIGS. 2 and 3 are side elevational views of the welding apparatus of FIG. 1 showing the apparatus before and after touch-down.
Figure 3:
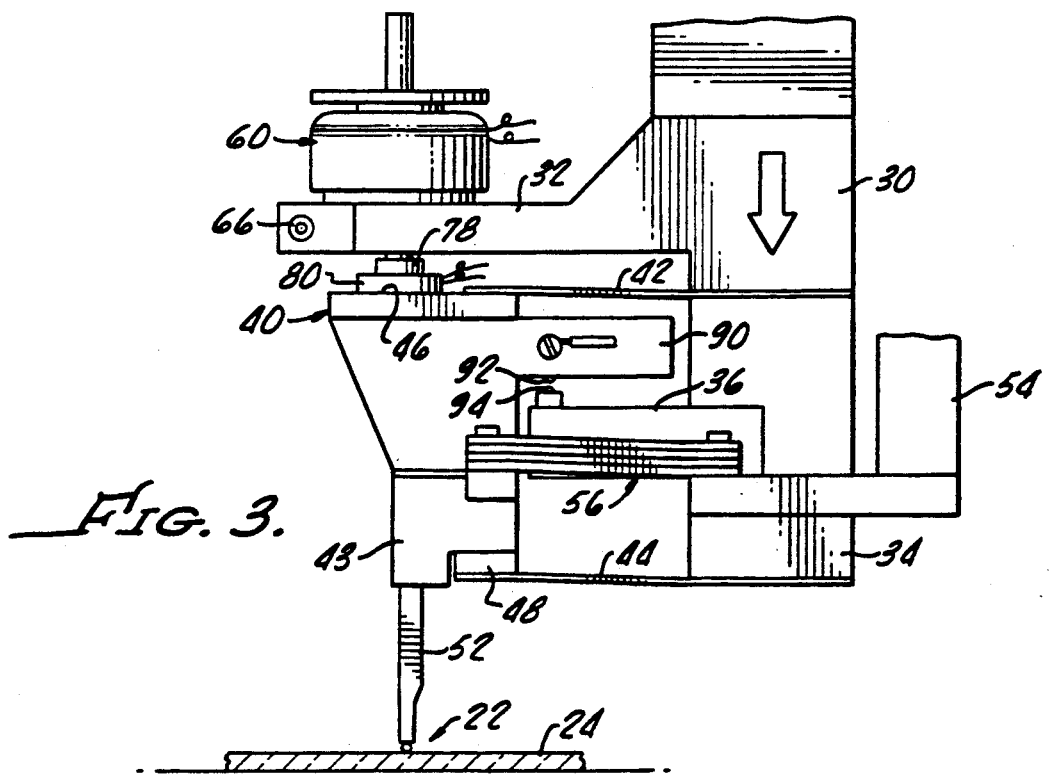

As can be best seen in FIGS. 2 and 3, the weld head has a rearwardly extending arm 90 which carries a first contact 92 of a pair of touch-down contacts. A second touch-down contact 94 is carried by the contact support arm 36 of the Z axis carriage slide body 30. The axis of the solenoid and its plunger is aligned with a vertical axis 96 (see FIG. 4) that itself is aligned with an axis of symmetry of the electrodes.

In operation, the weld head assembly is initially positioned horizontally in X and Y so that the electrodes 50,52 are positioned directly above the work piece. Weight of the weld head on its flexural supports 42,44 ensures contact between the touch-down contacts 92 and 94 (as shown in FIG. 2). If deemed necessary or desirable, a small amount of current may be applied to the solenoid coil to press the weld head downwardly to ensure electrical connection between the contacts 92 and 94. The Z axis carriage slide 16 is then driven downwardly until the lowermost ends of the electrodes contact the work piece, at which point further downward motion of the weld head itself is stopped by such contact. However, the carriage slide is driven further downwardly through a small additional predetermined over-travel distance, which may be in the order of between about 0.006 and 0.014 inches. This over-travel distance causes the carriage slide to move downwardly a slight distance relative to the weld head so that in this touch-down position, which is illustrated in FIG. 3, the touch-down contacts are separated by a small amount, thereby to signal occurrence of touch-down. Moreover, the flexural supports 42,44 and the copper shunt plates 56 are bent by a very slight amount, as may be seen in FIG. 3.

The lifting of the weld head relative to the slide after touch-down (actually the lowering of the slide relative to the weld head in its touch-down position) sets the gap in the solenoid and sets the preload force on the work piece. Current is then sent to the solenoid coil, which drives the solenoid plunger 70,72 down through the in-line force system and applies the desired force to the work piece. As previously mentioned, the solenoid plunger is axially aligned precisely with the symmetrical axis of the electrodes. The precise axial direction and alignment of this force with the electrodes is assisted by the ball and socket joint. The force of the solenoid is applied to the load cell 80. This creates a voltage change in the output of the load cell, which produces an output force signal proportional to the amount of force applied to the load cell. This output force signal from the load cell is employed to control the amount of current through the solenoid coil, as will be explained in connection with the description of the circuit of FIG. 5 below.

The ball and socket interconnection between the solenoid and the weld head eliminates any side loading that may be caused by misalignment of the plunger-to-load cell interface. The arrangement provides for direct in-line force to be transmitted precisely through the weld head and electrodes into the work piece along the axis of the electrodes and eliminates moments and stray force vectors that may arise from poorly controlled mechanical interfaces.

The gap of the solenoid is adjusted by the threaded connector fitting 62 by loosening the split collar or split end of the weld or slide arm 32 and rotating the solenoid and its connector to provide for a fine threaded adjustment of the solenoid gap. The fitting threading in a particular embodiment is chosen to be 0.875-20 UNEF so that a 15° rotation of the fitting 62 adjusts the solenoid gap by approximately 0.002 inches. The solenoid gap can also be set by controlling the amount of over-travel of the carriage slide, but adjustment by rotation of the connector fitting 62 establishes a minimum preload force.

The weld head 40 is preferably made of a polyimide (unmodified Ultem) to provide for electrical and mechanical insulation as well as low weight and inertia and higher melting temperature than many plastics. The current carrying copper shunts 56 are positioned parallel to the flexure springs 42,44 so as to minimize their effect on head movement. This precise horizontal position, parallel to the flexural supports, also decreases shunt length, which reduces weight, inertia and electrical resistance. The very small thickness of the shunts also helps to reduce resistance to head motion in the Z axis.

Figure 5:
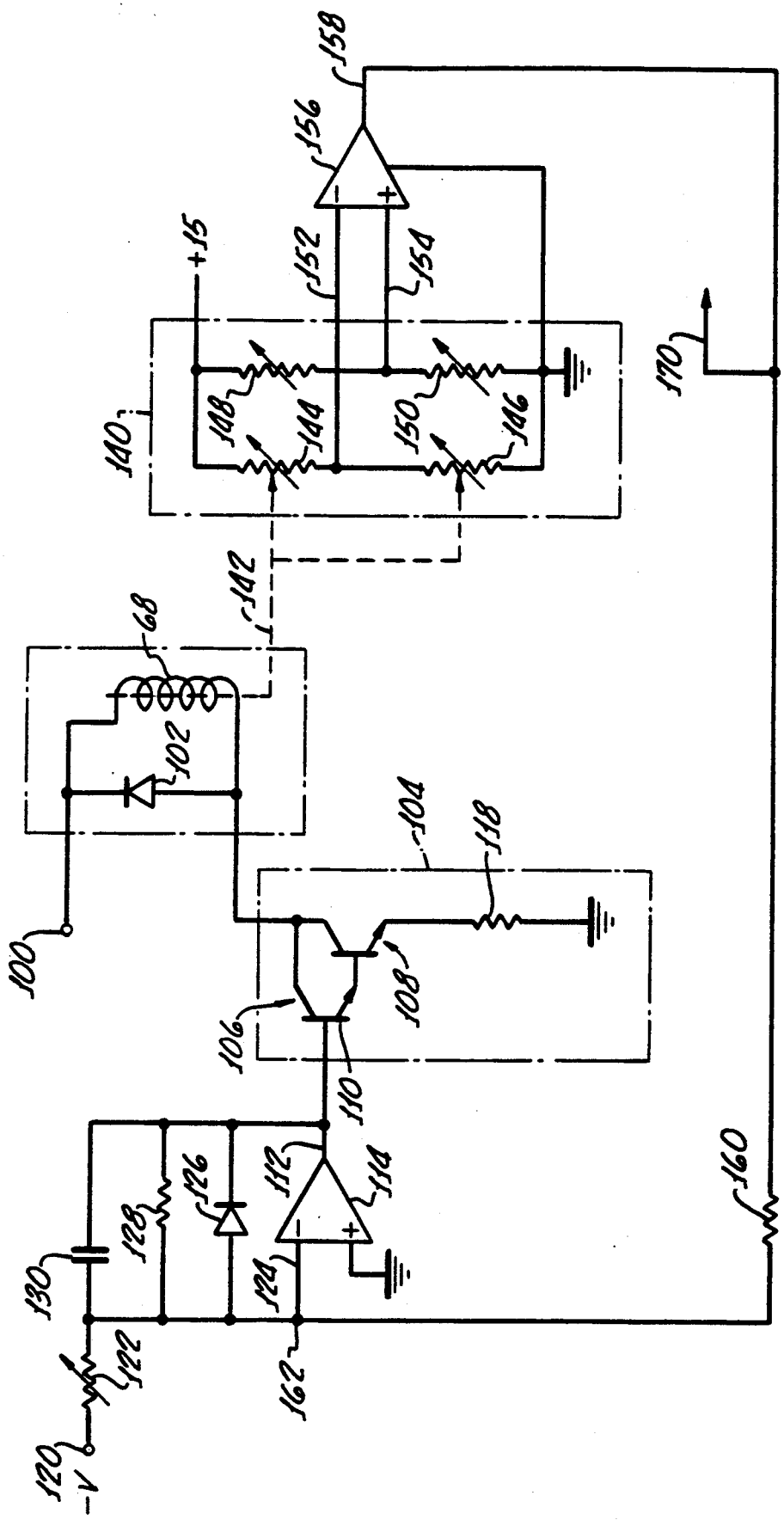
FIG. 5 is a circuit diagram of a closed loop control for the force applying solenoid of the described apparatus.

Illustrated in FIG. 5 is a circuit of an exemplary closed loop feedback arrangement that accepts a commanded force signal and servos the solenoid current to provide a force established by an input command.

Solenoid coil 68, shown in the upper center portion of FIG. 5, receives current from a terminal 100 connected to a suitable DC source, such as 24 volts DC, and has a diode 102 connected across the coil, as is conventional. The solenoid current is fed back to the other side, or ground, of the source through a current regulating circuit 104 composed of first and second cascaded transistors 106,108, of which the first transistor, transistor 106, has its base 110 connected to the output 112 of a differential error amplifier 114. The collectors of the transistors 106,108 are connected together and to one end of the solenoid coil, whereas the emitter of transistor 106 is connected to the base of transistor 108 and the emitter of transistor 108 is connected to ground (and the other side of the DC source) via a resistor 118. A commanded force signal is provided from an input terminal 120 via a potentiometer 122, which is adjustable to control the amount of commanded force. The command signal is fed to the inverting input 124 of a differential amplifier 114, which has its non-inverting input connected to ground. Three parallel feedback paths are provided between the output and inverting input of amplifier 14 via a diode 126, a resistor 128 and a capacitor 130.

Application of force by the solenoid to the load cell, which is indicated within the phantom line box 140 in FIG. 5, is represented by dotted lines 142. The load cell 140 is schematically indicated as a Wheatstone bridge comprised of four variable resistors 144,146,148 and 150, with outputs from the bridge being derived on a pair of lines 152,154 connected respectively to the junctions of the resistor pair 144,146 and to the resistor pair 148,150. The load cell outputs are fed to the inverting and non-inverting inputs respectively of a differential output amplifier 156, at the output of which, on a line 158, appears a force signal proportional to the force applied to the load cell.

The force signal on line 158 is fed via a resistor 160 to a summing junction 162, which is the junction of potentiometer 122 and resistor 160, and which is connected to the inverting input 124 of error amplifier 114. Thus the amplifier receives the difference between the measured force signal and the commanded force signal and employs this difference signal to control current regulator 104 so as to adjust the magnitude of current flowing through the solenoid coil 68.

The feedback force signal on line 158 may be provided as an output on a line 170 to be fed to a suitable recording device to provide a history or record of the force applied during each of the welds.

In a particular example for use with welding electrodes adapted to weld interconnecting mesh of solar cells, each electrode has a cross section at its welding end of about 0.006×0.095 inches, and the two are separated by a gap of about 0.005 inches. This arrangement is considerably longer and narrower than parallel-gap electrodes employed in other applications. For such an application a weld current of about 300 amps and 0.96 volts is applied for 0.070 seconds to resistance heat the work piece to about 700° C., which temperature may be controlled by infrared feedback. A total weld force of about 2 pounds is applied by the solenoid to create a bonding pressure, with the above described exemplary electrode configuration and with a 40% solid mesh (60% open) work piece, of about 4400 psi. If deemed necessary or desirable, the force applied to the weld heads can be programmed so as to cause the electrodes to apply a force that ramps up from a low initial force magnitude to its full 4400 psi magnitude. The force is accurately controlled throughout the duration of the weld to provide repeatable and controllable welding forces and force profiles.

There have been described welding methods and apparatus wherein a weld force of precisely controlled magnitude is applied to the welding tool in direct alignment with the tool, and in which the applied force is monitored for use in a closed loop control of weld pressure magnitude.

What is claimed is:

1. Pressure welding apparatus comprising:
   a weld head support,
   a weld head movably mounted to the support,
   means for moving the weld head relative to the weld head support toward and away from a work piece to be welded,
   electrode means carried by the weld head and adapted to be pressed against a workpiece to be welded,
   drive means for applying force to said weld head to thereby cause said electrode means to press against a workpiece, wherein said drive means includes a solenoid coil,
   pressure sensing means interposed between said drive means and said weld head for generating a force signal representative of force applied by said drive means, wherein said pressure sensing means includes a load cell generating said force signal,
   feedback means responsive to said force signal for controlling said drive means and for generating a command signal,
   a difference circuit responsive to said force signal and to the command signal for generating an error signal,
   current control means in circuit with said solenoid coil and responsive to said error signal for controlling current in said solenoid coil in accordance with said force signal, and
   means for controlling the axial direction and alignment of the drive means and the weld head comprising ball and socket means between said solenoid and said load cell.

2. A parallel-gap welder comprising:
   a support,
   a carriage slide mounted to the support for vertical motion,
   means for driving the carriage slide relative to the support,
   a slide body fixed to the slide and having a forwardly extending upper arm, said upper arm having an internally threaded aperture extending therethrough,
   a solenoid having a housing, a solenoid coil and a solenoid plunger extending through the solenoid and through the carriage upper arm,
   a connector fitting fixed to the housing and threadedly engaged with said threaded aperture,
   means for feeding electric current to said coil,
   a weld head positioned beneath said upper arm, first and second mutually spaced parallel spring strips having opposite ends thereof respectively fixed to said weld head and to said carriage slide, whereby said weld head is flexurally mounted to and carried by said carriage slide for a limited amount of displacement relative to the carriage slide, first and second touch-down contacts mounted respectively on said weld head and carriage slide and being in contact with one another in a normal position of said weld head relative to said carriage slide, said contacts being separated from one another upon displacement of said weld head relative to said carriage slide, a load cell interposed between said solenoid plunder and said weld head for generating a force signal representative of force applied by said solenoid plunger, a pair of welding electrodes carried by said weld head in alignment with said solenoid plunger, feedback means responsive to said force signal for controlling said solenoid plunger and for generating a command signal, a difference circuit responsive to said force signal and to the command signal for generating an error signal, current control means in circuit with said solenoid coil and responsive to said error signal for controlling current in said solenoid coil in accordance with said force signal, means for controlling the axial direction and alignment of the solenoid and the load cell comprising ball and socket means between said solenoid and said load cell, and means for conducting electrical current to said electrodes.

3. The welder of claim 2 including closed loop feedback means responsive to said load cell for controlling said electric current to said coil.

* * * * *